United States Patent
Furuya et al.

[19]

[11] Patent Number: 5,960,897
[45] Date of Patent: Oct. 5, 1999

[54] AUXILIARY VEHICLE DRIVING SYSTEM

[75] Inventors: Takehiko Furuya; Keiichi Murayama; Yasuharu Oyama; Yutaka Arimura, all of Wako, Japan

[73] Assignee: Honda Giken Kogyo Kabushiki Kaisha, Tokyo, Japan

[21] Appl. No.: 08/921,252

[22] Filed: Aug. 29, 1997

[30] Foreign Application Priority Data

Aug. 29, 1996 [JP] Japan .................................. 8-228943

[51] Int. Cl.⁶ .................................................. B60K 1/00
[52] U.S. Cl. ........................................ 180/65.4; 180/243
[58] Field of Search ................... 180/242, 243, 180/247, 65.2, 65.3, 65.4

[56] References Cited

U.S. PATENT DOCUMENTS

| | | | |
|---|---|---|---|
| 3,057,427 | 10/1962 | Glasgow | 180/243 |
| 3,186,506 | 6/1965 | Leach et al. | 180/243 |
| 3,584,713 | 6/1971 | Tani et al. | 192/38 |
| 4,180,138 | 12/1979 | Shea | 180/243 |
| 4,493,387 | 1/1985 | Lake et al. | 180/248 |
| 4,923,025 | 5/1990 | Ellers | 180/65.4 |
| 5,103,950 | 4/1992 | Ito et al. | 192/35 |
| 5,176,213 | 1/1993 | Kawai et al. | 180/65.4 |
| 5,495,906 | 3/1996 | Furutani | 180/242 |
| 5,788,005 | 8/1998 | Arai | 180/247 |
| 5,842,534 | 12/1998 | Frank | 180/65.2 |
| 5,898,282 | 4/1999 | Drozdz et al. | 318/139 |

*Primary Examiner*—Robert J. Oberleitner
*Assistant Examiner*—Andrew J. Fischer
*Attorney, Agent, or Firm*—Armstrong, Westerman, Hattori, McLeland & Naughton

[57] ABSTRACT

An auxiliary driving system is provided to ensure that a vehicle equipped with an automatic transmission can be moved or permitted to travel without use of the driving force of the vehicle engine in the event of an emergency. The main driving wheels are normally driven through an engine and an automatic transmission and a pair of auxiliary driving wheels are driven by motors. In a usual state, the motors are used to generate an auxiliary driving force or a creep force in the vehicle. However, if the vehicle engine is stopped due to engine trouble or failure, the motors can be driven based on the amount of accelerator pedal depressed to rotate the auxiliary driving wheels and thereby permit the vehicle to travel. Thus, movement of the vehicle can be easily accommodated in the event of an emergency such as when the vehicle engine has failed.

16 Claims, 9 Drawing Sheets

AUXILIARY VEHICLE DRIVING SYSTEM

BACKGROUND OF THE INVENTION

1. Field of the Invention

The present invention relates to an auxiliary driving system for a vehicle which is adapted to travel by an auxiliary driving source such as a motor during stoppage of the vehicle engine.

2. Description of the Related Art

A vehicle equipped with a manual transmission can be permitted to travel by rotating wheels by driving a starter motor in a condition where a predetermined shift stage has been established to bring a clutch into its engaged state when an engine has been stopped due to engine trouble, engine failure or the like. If the vehicle is equipped with a manual transmission, as described above, the vehicle can be permitted to travel by the driving force of the starter motor in the event of an emergency and thus, the vehicle can be moved to a safe place.

In a vehicle equipped with an automatic transmission, however, a starter motor is driven only when the shift position is a neutral "N" position or a park "P" position. For this reason, moving the vehicle by the starter motor is not feasible.

SUMMARY OF THE INVENTION

The present invention has been accomplished with the above circumstance in view, and it is an object of the present invention to ensure that a vehicle equipped with an automatic transmission can be moved or permitted to travel without recourse to the driving force of the vehicle engine in the event of an emergency.

According to the present invention, if the engine is stopped due to engine trouble or failure, the wheels can be driven by an auxiliary driving source to permit the vehicle to travel. This is extremely effective for moving the vehicle in the event of an emergency.

In a preferred embodiment of the present invention, if the engine drives the front wheels of a vehicle, the auxiliary driving source drives the rear wheels. If the engine drives the rear wheels, the auxiliary driving source drives the front wheels. Therefore, the driving system using the engine and the driving system using the auxiliary driving source can not interfere with each other, thus leading to a simplified structure.

Further, according to the present invention, if the accelerator pedal is operated, the auxiliary driving source is driven, thereby permitting the vehicle to travel. Therefore, the vehicle can be moved or permitted to travel by the same operation of the accelerator pedal as one would use for moving the vehicle normally under power of the engine.

The mode for carrying out the present invention will now be described by way of an embodiment with reference to the accompanying drawings.

DESCRIPTION OF THE PREFERRED EMBODIMENT

Figure 1:
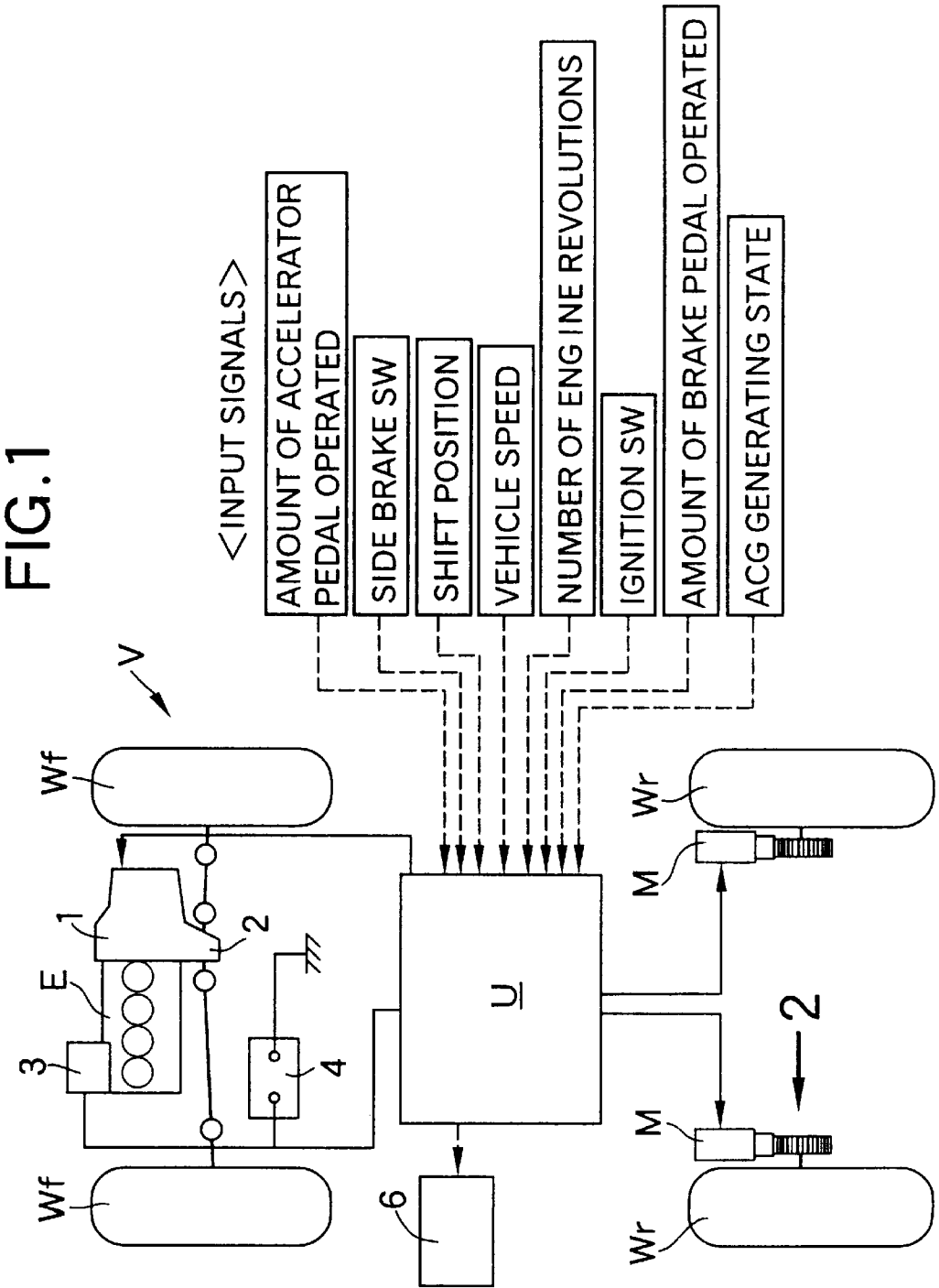
FIG. 1 is an illustration of a vehicle according to an embodiment of the present invention.
Figure 2:
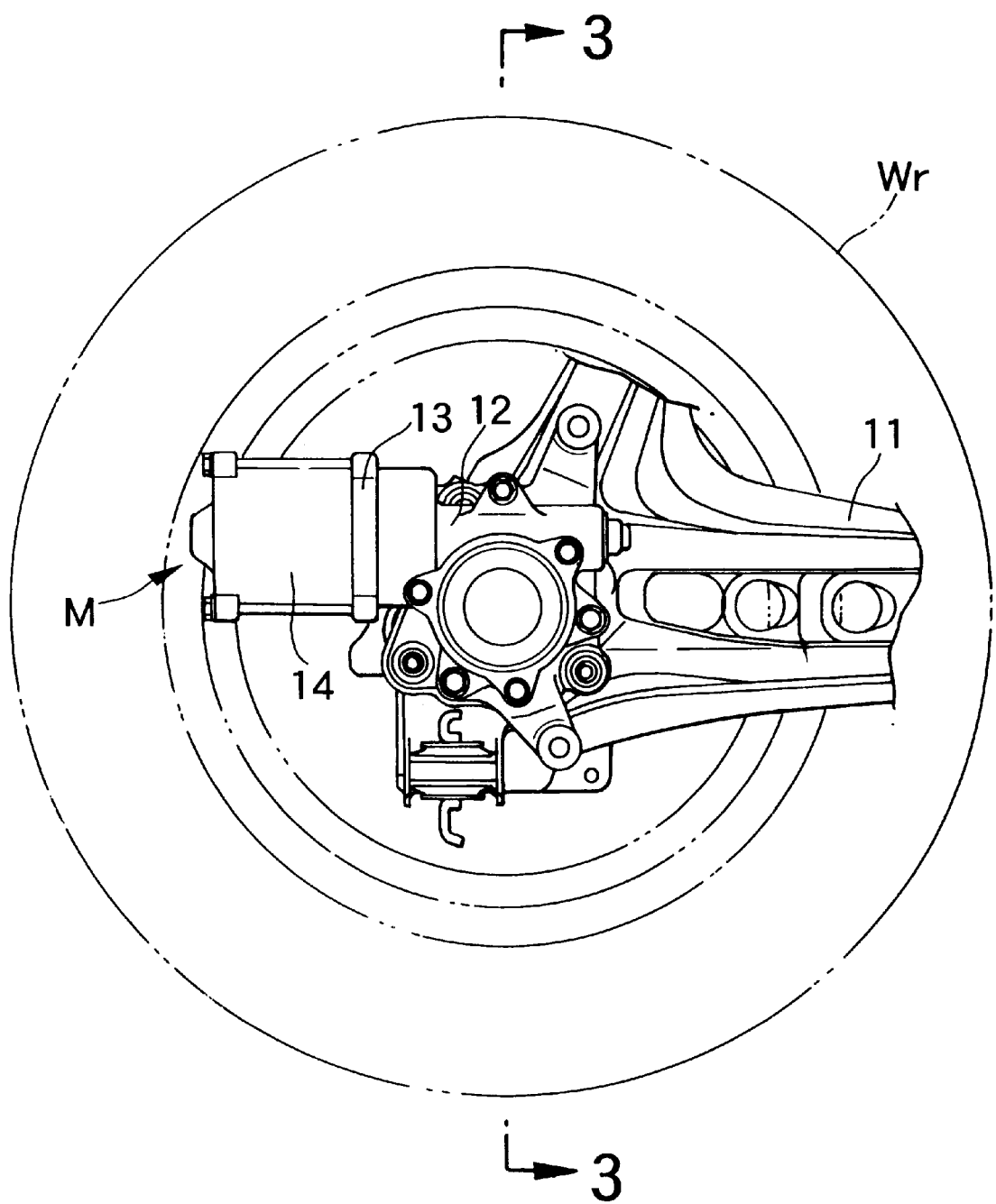
FIG. 2 is an enlarged view taken along an arrow 2 in FIG. 1.
Figure 3:
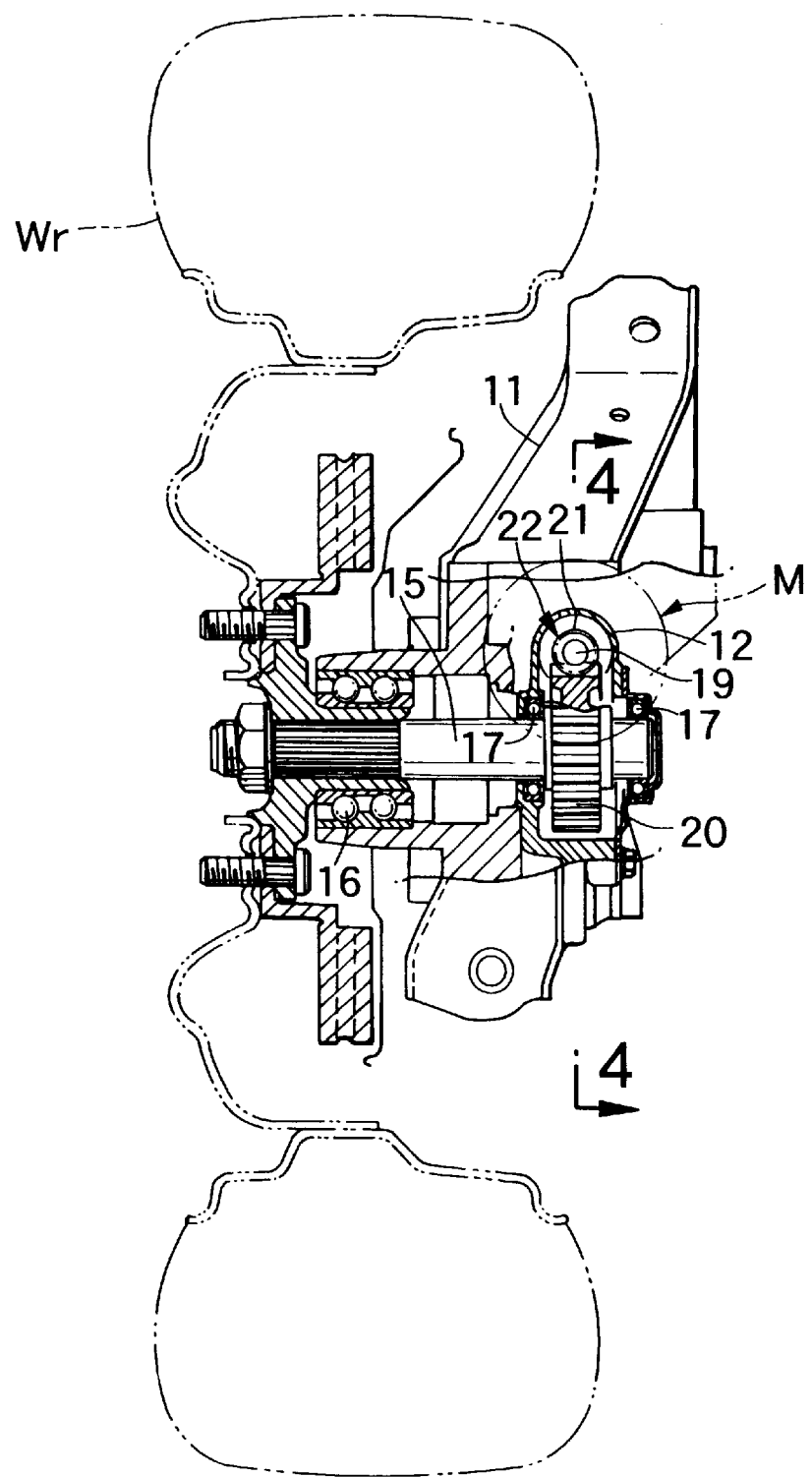
FIG. 3 is a sectional view taken along a line 3—3 in FIG. 2.
Figure 4:
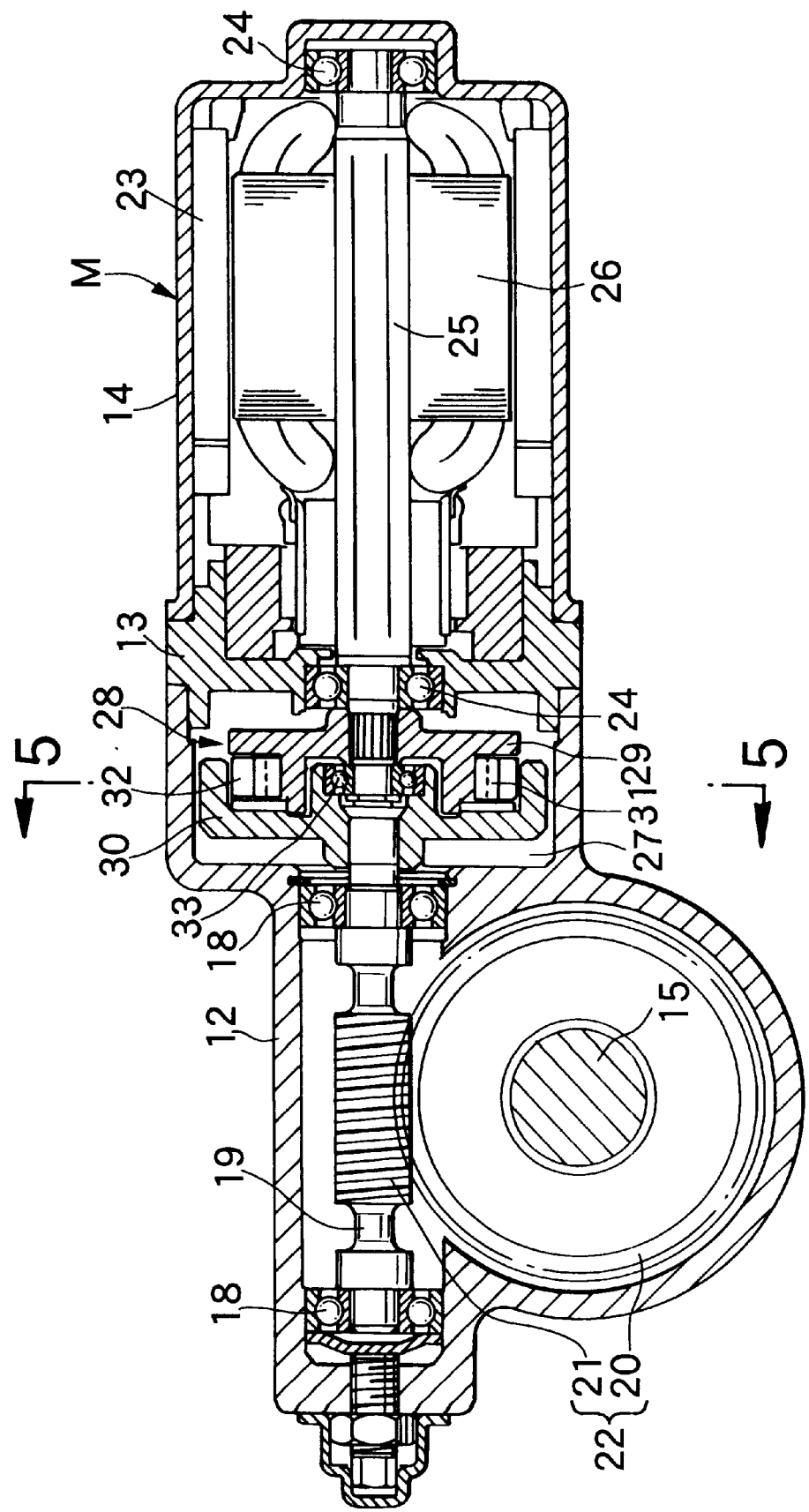
FIG. 4 is a sectional view taken along a line 4—4 in FIG. 3.

As shown in FIG. 1, a hybrid vehicle according to an embodiment of the present invention includes a pair of left and right main driving wheels Wf at a front portion of a vehicle body, and a pair of left and right auxiliary driving wheels Wr at a rear portion of the vehicle body. A driving force from an engine E is transmitted to the left and right main driving wheels Wf through an automatic transmission 1 and a differential 2. The left and right auxiliary driving wheels Wr are driven by a pair of left and right motors M, respectively. An electronic control unit U comprised of a microcomputer is mounted between a battery 4 charged by a generator 3 driven by the engine E and the motors M driven by the battery 4. The electronic control unit U controls the shifting of the transmission 1, the driving of the motors M connected to the auxiliary driving wheels Wr and the operation of a warning means 6 such as a lamp or a buzzer for warning a driver upon generation of an abnormality in certain conditions relative to operation of the vehicle, such as for example, the amount of depression of an accelerator pedal, actuation of a side or auxiliary brake switch, a shift position of the transmission 1, a vehicle speed, a number of revolutions of the engine, an ignition switch, an amount of brake pedal operated, and signals indicative of the generating state of the generator 3.

The structure of a driving force transmitting system for each of the auxiliary driving wheels Wr will be described with reference to FIGS. 2 to 5. The driving force transmitting systems for the left and right auxiliary driving wheels Wr have the same structure and hence, the structure of a driving force transmitting system for the left auxiliary driving wheel will be described below as one example.

A gear box 12 is mounted at a rear end of a suspension arm 11 for supporting the auxiliary driving wheel Wr on the vehicle body for vertically swinging movement, and a housing 14 of the motor M is coupled to the gear box 12 through a partition wall 13. An axle 15 of the auxiliary driving wheel Wr is supported at one end thereof on the suspension arm 11 through a ball bearing 16 and at the other end thereof on the gear box 12 through a pair of ball bearings 17. A worm shaft 19 is disposed in a longitudinal direction of the vehicle body and is supported through a pair of ball bearings 18 within the gear box 12. A worm 21 integrally formed on the worm shaft 19 is meshed with a worm wheel 20 secured to the axle 15. The worm wheel 20 and the worm 21 constitute a worm gear mechanism 22.

In the worm 21 of the worm gear mechanism 22, a lead angle of the ridge of helical threads provided around an outer periphery of the worm 21 is set at a large value. Therefore, it is possible not only to transmit the number of revolutions from the worm 21 toward the worm wheel 20 in a speed-reduced manner, but also to transmit the number of rotations from the worm wheel 20 toward the worm 21 in a speed-increased manner. By employing the worm gear mechanism 22 in the system for transmitting the driving force from the motor M to the auxiliary driving wheel Wr in the above manner, a large reduction ratio can be achieved with a minimum number of gears to provide reductions in sizes and weights of the motor M and the driving force transmitting system.

The motor M includes a stator 23 fixed to an inner periphery of the housing 14, an output shaft 25 supported at the housing 14 and the partition wall 13 through a pair of ball bearings 24, and a rotor 26 secured to the output shaft 25. A two-way clutch chamber 27 is defined in the gear box 12 adjacent the partition wall 13, and a two-way clutch 28 is mounted in the two-way clutch chamber 27 between a rear end of the worm shaft 19 and a front end of the output shaft 25 of the motor M, which are coaxially opposed to each other. The two-way clutch 28 is adapted to permit the driving force to be transmitted from the motor M to the auxiliary driving wheel Wr, even if the motor M is rotated in one direction or reversed, and to prevent transmission of a driving force from the auxiliary driving wheel Wr to the motor M, when the auxiliary driving wheel Wr is rotated or reversed.

The two-way clutch 28 includes an inner member 29 secured to the output shaft 25 of the motor M, and an outer member 30 secured to the worm shaft 19. The inner member 29 and the outer member 30 are coaxially disposed, and a tip end of the output shaft 25 of the motor M is supported on an inner periphery of the outer member 30 through a ball bearing 33.

Eight cam member slide faces $29_1$ arranged in a regular octagonal shape are formed on an outer periphery of the inner member 29, and a circular roller guide face $30_1$ is formed on an inner periphery of the outer member 30 in an opposed relation to the cam member slide faces $29_1$. Radially inner or bottom surfaces of eight cam members 31 formed in a substantially trapezoidal shape are slidably in abutment against the eight cam member slide faces $29_1$, and oblique sides of the adjacent cam members 31 are in contact with each other. Radially outer surfaces of the cam members 31 are formed as recessed cam faces $31_1$ and eight rollers 32 are arranged between the cam faces $31_1$ and the roller guide face $30_1$ of the outer member 30. When the transmission of the driving force is not carried out between the inner and outer members 29 and 30, the eight cam member slide faces $29_1$ the eight cam members 31 and the eight rollers 32 are radially in line, with a slight gap being defined between each of the rollers 32 and the roller guide face $30_1$ as shown in FIG. 5.

Figure 5:
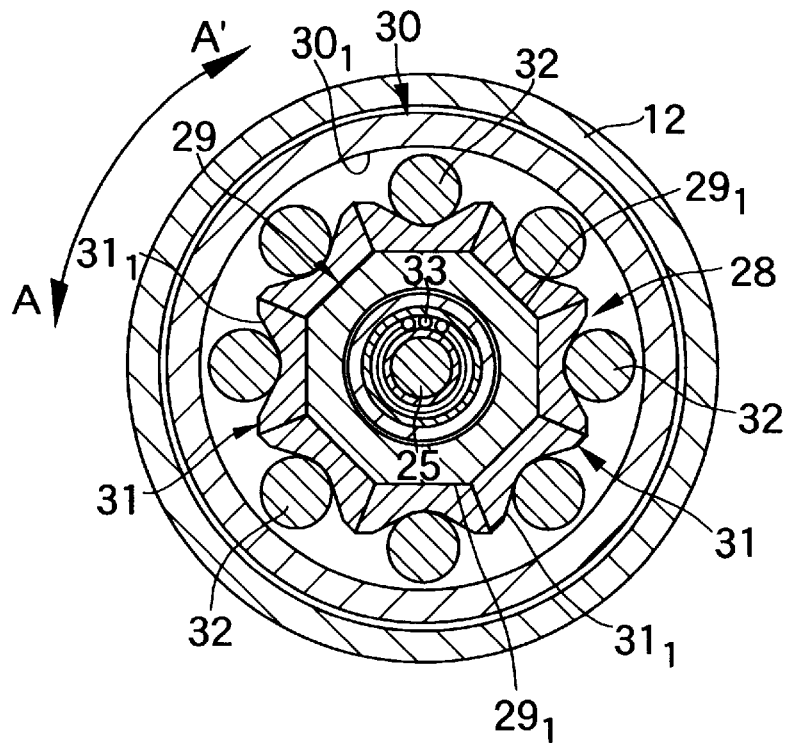
FIG. 5 is a sectional view taken along a line 5—5 in FIG. 4.

When the driving force is transmitted from the auxiliary driving wheel Wr to the clutch 28, namely, when the driving force is transmitted from the outer member 30 to the inner member 29, the two-way clutch 28 is brought into its OFF state in which it cuts off the transmission of the driving force, by the gap defined between each of the rollers 32 and the roller guide face $30_1$, as shown in FIG. 5. The OFF state of the two-way clutch 28 is likewise provided during both forward and backward travel of the vehicle, i.e., when the outer member 30 is rotated in either of the directions indicated by the arrows A and A'.

Figure 6:
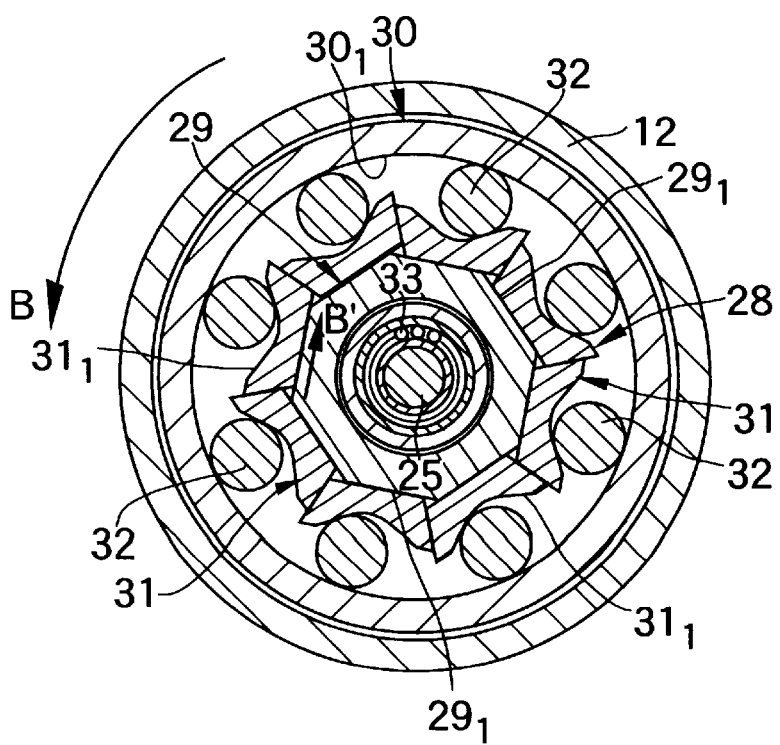
FIG. 6 is a view similar to FIG. 5 for explaining the operation during forward traveling of the vehicle.

When the driving force is transmitted from the motor M to the auxiliary driving wheel Wr during forward traveling of the vehicle, namely, when the driving force is transmitted from the inner member 29 rotated in a direction of an arrow B as shown in FIG. 6 to the outer member 30, the cam members 31 slide in a direction indicated by the arrow B' on the cam member slide faces $29_1$ of the inner member 29, respectively. As a result, the rollers 32 bite or frictionally engage between the cam faces $31_1$ of the cam members 31 and the roller guide face $30_1$ of the outer member 30, so that a torque of the inner member 29 is transmitted to the outer member 30 through the cam members 31 and the rollers 32.

Figure 7:
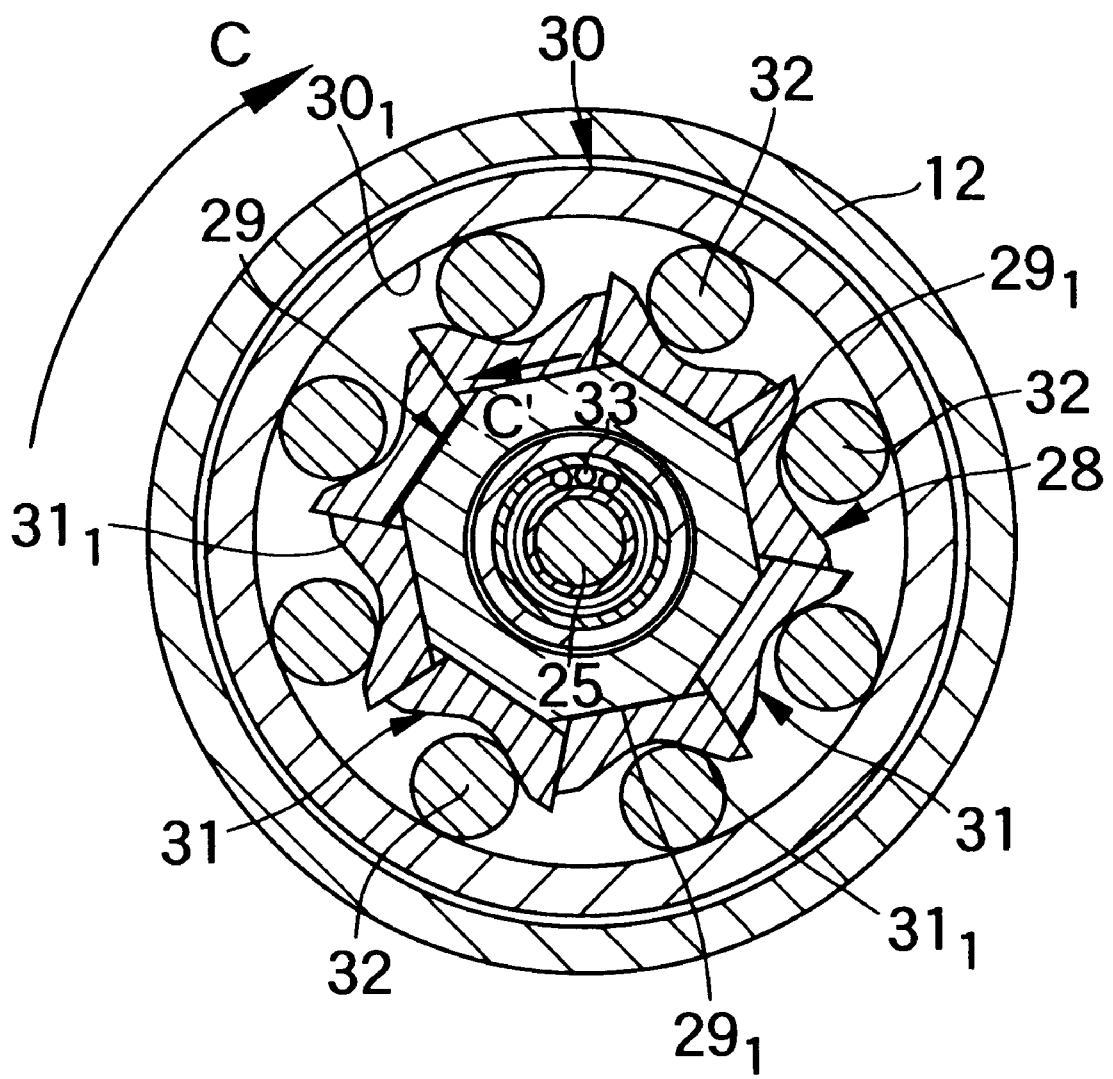
FIG. 7 is a view similar to FIG. 5 for explaining the operation during backward traveling of the vehicle.

Conversely, when the driving force is transmitted from the motor M to the auxiliary driving wheel Wr during backward travel of the vehicle, namely, when the driving force is transmitted from the inner member 29 rotated in a direction of an arrow C as shown in FIG. 7 to the outer member 30, the cam members 31 slide in a direction indicated by the arrow C' on the cam member slide faces $29_1$ of the inner member 29. As a result, the rollers 32 bite into or frictionally engage between the cam faces $31_1$ of the cam members 31 and the roller guide face $30_1$ of the outer member $30_1$ so that the torque of the inner member 29 is transmitted to the outer member 30 through the cam members 31 and the rollers 32.

As described above, the main driving wheels Wf are driven by the engine E, and the auxiliary driving wheels Wr are driven by the motors M. Therefore, the driving system using the engine E and the driving system using the motors M cannot interfere with each other, and the structures of the driving systems are simplified.

The operation of the embodiment of the present invention having the above-described arrangement will be described below with reference to the flow charts shown in FIGS. 8 and 9.

Figure 8:
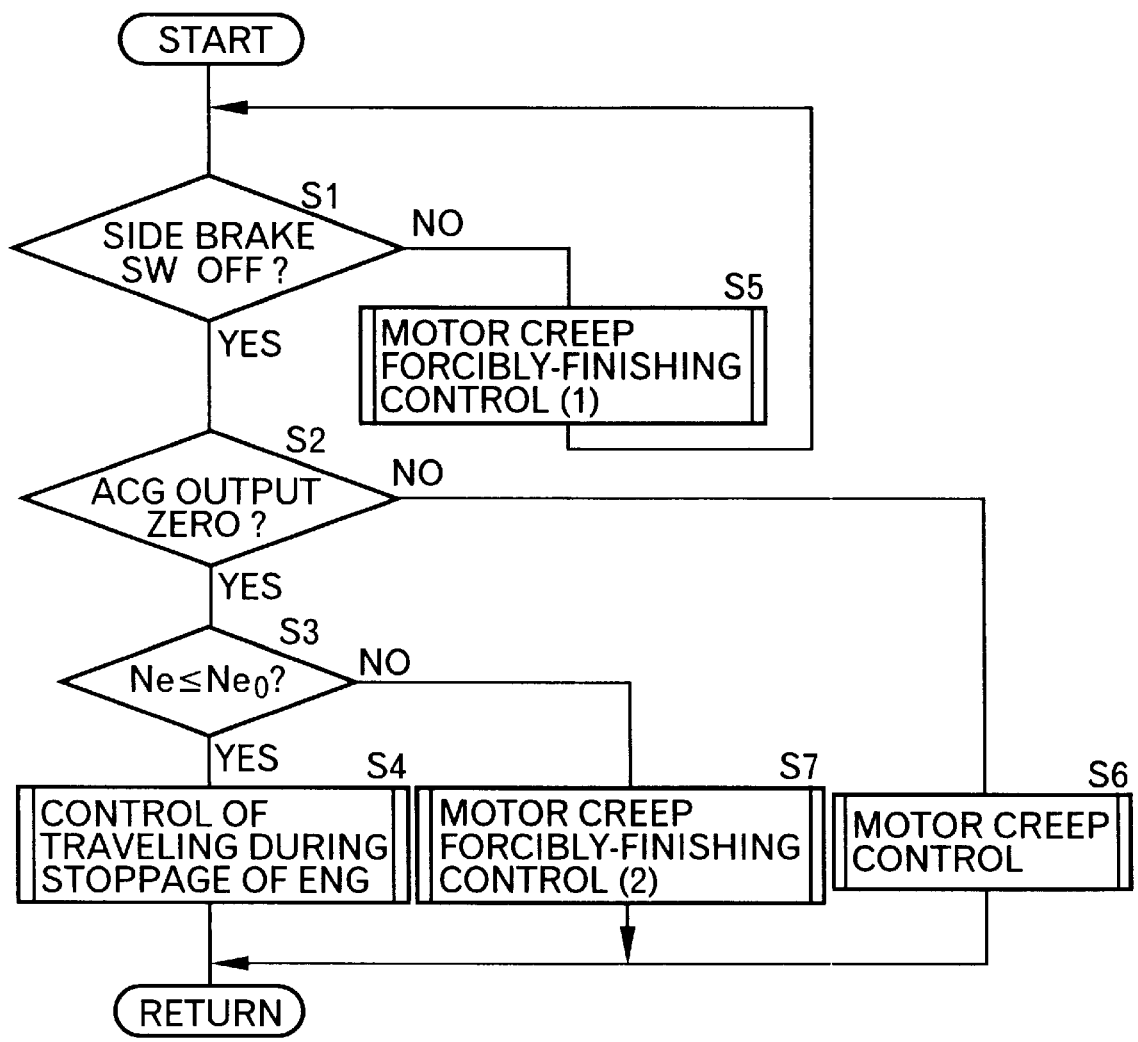
FIG. 8 is a flow chart of a main routine.
Figure 9:
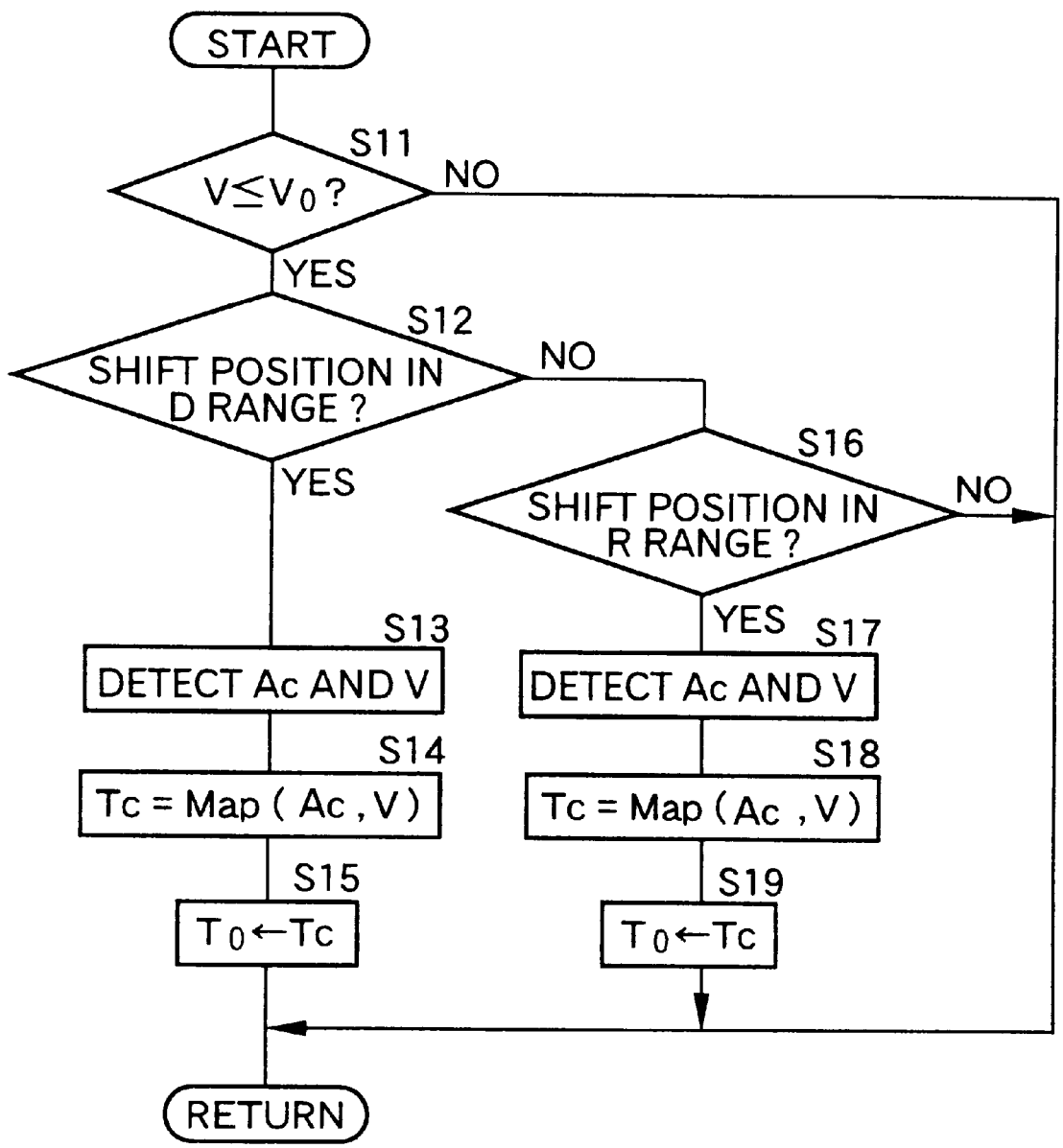
FIG. 9 is a flow chart of a sub-routine at step S4 of FIG. 8.

In a flow chart of a main routine shown in FIG. 8, if a side or auxiliary brake switch is in an OFF state at step S1; an output from the generator 3 is zero at step S2; and the number Ne of revolutions of the engine is equal to or smaller than a threshold value Neo (e.g., 300 rpm) that is, lower than a number of revolutions during idling of the engine at step S3, it is determined that the engine E is in a stopped state, and "a control of traveling during stoppage of the engine" is carried out at step S4. If the side brake switch is in an ON state at step S1, it is determined that a driver has an intention to stop the vehicle, and "a motor creep forcibly-finishing control (1)" is carried out at step S5.

If the side or auxiliary brake switch is in the OFF state at step S1, and the output from the generator 3 is not zero at step S2, it is determined that the engine E is in operation, and "a motor creep control" is carried out at step S6. If the number Ne of revolutions of the engine exceeds the threshold value Neo at step S3 notwithstanding that the side brake switch is in the OFF state at step S1 and the output from the generator 3 is zero at step S2, it is determined that there is an abnormality in the generator 3, and "a motor creep forcibly-finishing control (2)" is carried out at step S7.

A sub-routine of "the control of traveling during stoppage of the engine" at step S4 will be described below with reference to the flow chart shown in FIG. 9.

Figure 10:
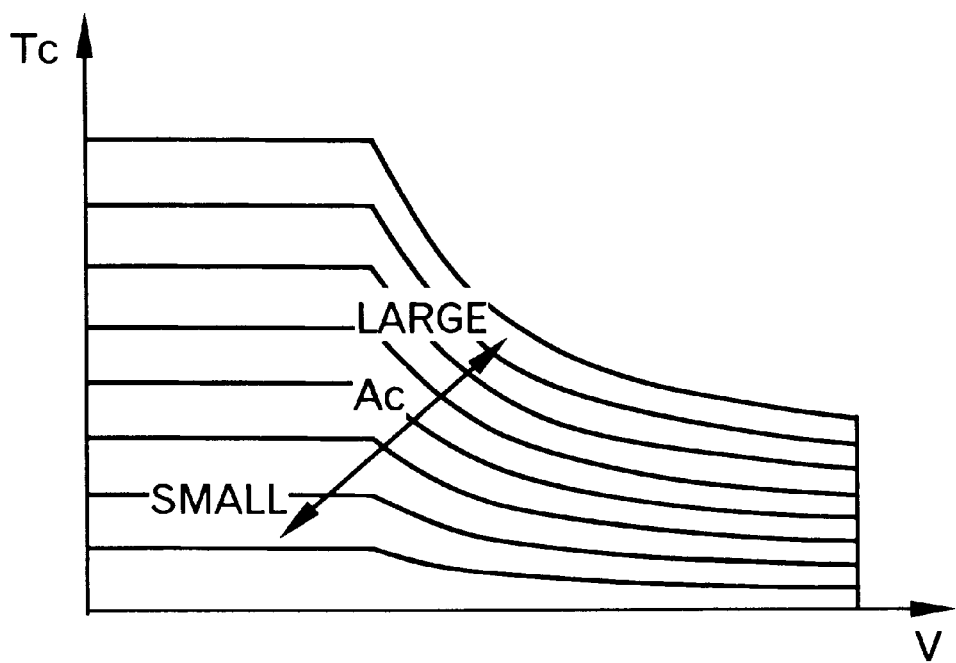
FIG. 10 is a map for searching a torque control value.

When the vehicle speed V is equal to or less than a threshold value Vo (e.g., a vehicle speed corresponding to an upper limit of rotational speed of the motors M) at step S11 and the shift position is at a "D " position at step S12, the processing is advanced to steps S13 to S15. At step S13, the amount Ac to which an accelerator pedal is depressed or operated and a vehicle speed V are detected, and at subsequent step S14, a torque control value Tc is located from a forward traveling map shown in FIG. 10 based on the amount Ac of accelerator pedal operated and the vehicle speed V. At step S15, the motors M are driven in a normal direction using the torque control value Tc as a torque target value To, thereby causing the vehicle to travel forward.

If the shift position is not at the "D" position at step S12, and the shift position is at "R" position at step S16, the processing is advanced to steps S17 to S19. At step S17, an amount Ac of accelerator pedal depression or operation and a vehicle speed V are detected, and at subsequent step S18, a torque control value Tc is located from a backward traveling map (not shown) based on the amount Ac of accelerator pedal operated and the vehicle speed V. Then, at step S19, the motors M are rotated in a reverse direction using the torque control value Tc as a torque target value To, thereby causing the vehicle to travel backward.

In this manner, when it is undesirable to generate engine noise, when it is undesirable to discharge an exhaust gas from the engine E, when the fuel is used up, when the engine E has failed and the like, the vehicle can be moved by the driving force of the motors M, and the sheltering and the like in the case of an emergency can be reliably performed. At this time, the motors M are driven in response to the operation of the accelerator pedal, as the engine E is normally driven, and hence, it is possible to move the vehicle in a manner similar to that during normal travel under engine power without having a sense of incompatibility.

The "motor creep forcibly-finishing control (1)" at step S5 will be further described below.

If the side brake switch is in the ON state, the "motor creep forcibly-finishing control (1)" is carried out irrespective of the operational state of the engine E. More specifically, the generation of a creep force by the motors M is discontinued by cutting-off the supply of electric power to the motors M, thereby saving the battery 4. At this time, the same control for the transmission 1 as in the conventional automatic vehicle is carried out in accordance with the operational state of the vehicle and the driver's operation.

The "motor creep control" at step S6 will be further described below.

When the side brake switch is in the OFF state and the output from the generator 3 is not zero (i.e., the engine is in operation), the "motor creep control" is carried out, and has the following three modes (1), (2) and (3):

(1) Driving the vehicle with creep forces provided by the engine E and the transmission 1;
(2) Driving the vehicle with a creep force provided by the motors M; and
(3) Driving the vehicle with a creep force provided by the engine E and the transmission 1 and a creep force provided by the motors M.

A reduction in fuel consumption, an enhancement in traveling performance and an enhancement in operability during a creep driving can be obtained by properly using the three modes (1), (2) and (3) in accordance with a particular situation.

The "motor creep forcibly-finishing control (2)" at step S7 will be further described below.

When the side brake switch is in the OFF state; and the output from the generator 3 is zero notwithstanding that the engine E is in operation and thus, it is determined that the generator 3 has failed, the "motor creep forcibly-finishing control (2)" is carried out, and as in the "motor creep forcibly-finishing control (1)", the generation of a creep force by the motors M is discontinued by cutting-off the supply of electric power to the motors M. As a result, even if the battery 4 cannot be sufficiently charged due to the failure of the generator 3, further consumption of the battery 4 by driving of the motors M can be avoided.

Although one embodiment of the present invention has been described in detail, it will be understood that the present invention is not limited to the above-described embodiment, and various modifications may be made without departing from the spirit and scope of the invention defined in the claims.

For example, in the disclosed embodiment the front wheels are driven by the engine E, and the rear wheels are driven by the motors M. However, the positional relationship may be reversed, and the front wheels or the rear wheels may be driven by both the engine E and the motors M. In addition, in the embodiment, the motors M are used as the auxiliary driving source, but a hydraulic driving means such as a hydraulic motor or a mechanical driving means such as a flywheel may also be employed. Further, the clutch connected to the auxiliary driving source is also not limited to a two-way clutch as disclosed in the embodiment, and an electromagnetic clutch or a hydraulic clutch may be employed.

Additionally, although the driving of the motors M are controlled based on the operation of the accelerator pedal during stoppage of the engine E in the embodiment, such driving may also be controlled based on the operation of a member other than the accelerator pedal, e.g., the operation of an ignition switch or another switch.

As discussed above, according to the present invention, the auxiliary driving system includes the auxiliary driving source capable of being driven independently from the driving of the engine, and a control means for driving the wheels by the auxiliary driving source under certain predetermined conditions of vehicle operation such as stoppage of the engine. Therefore, even if the engine is stopped due to engine trouble or failure, the wheels can be driven by the auxiliary driving source to permit the vehicle to travel, which is extremely effective for moving the vehicle in the event of an emergency.

Further, according to the disclosed embodiment of the present invention, one of the front wheels and the rear wheels are driven by the engine, and the other of the front wheels and the rear wheels are driven by the auxiliary driving source. Therefore, the driving system using the engine and the driving system using the auxiliary driving source cannot interfere with each other, which provides a simplified structure.

Moreover, according to the present invention, the auxiliary driving source may be driven based on the operation of the accelerator pedal. Therefore, the operator may experience a traveling of the vehicle using the auxiliary driving source similar to travel under the engine power without a sense of incompatibility.

What is claimed is:

1. An auxiliary driving system in a vehicle normally driven by transmitting a driving force of an engine to at least one driving wheel of the vehicle through an automatic transmission, comprising:

an auxiliary driving source capable of driving a wheel independently of the vehicle engine, and means for selectively drivingly connecting said auxiliary driving source to at least one wheel of the vehicle upon detection of a combination of predetermined conditions of a side brake switch, a generator output current, and an engine revolution per minute.

2. An auxiliary driving system in a vehicle according to claim 1, wherein at least one of a front wheel and a rear wheel is normally driven by said vehicle engine, and the other of said front wheel and said rear wheel is selectively driven by said auxiliary driving source.

3. An auxiliary driving system in a vehicle according to claim 1, wherein said means for selectively drivingly connecting said auxiliary driving source to at least one wheel of the vehicle includes a clutch for drivingly connecting said auxiliary driving source to said at least one wheel of said vehicle and a control unit for selectively engaging said clutch to drive said at least one wheel.

4. An auxiliary driving system in a vehicle according to claim 1, wherein said auxiliary driving source is a motor having an output shaft, and said means for selectively drivingly connecting said auxiliary driving source to at least one wheel of said vehicle includes a gear reduction drivingly connecting said output shaft of said motor to said at least one wheel of said vehicle and a control unit for selectively operating said motor to drive said at least one wheel.

5. An auxiliary driving system in a vehicle according to claim 1, wherein said predetermined conditions further include stoppage of said vehicle engine.

6. An auxiliary driving system in a vehicle according to claim 1, wherein said predetermined conditions further include depression of an accelerator pedal.

7. An auxiliary driving system in a vehicle according to claim 1, wherein said predetermined conditions further include a vehicle speed, one of a forward and a reverse drive condition, and depression of an accelerator pedal.

8. An auxiliary driving system in a vehicle normally driven by transmitting a driving force of an engine to a pair of driving wheels of the vehicle through an automatic transmission, comprising:

an auxiliary driving source capable of being driven independently of the vehicle engine, and means for drivingly connecting said auxiliary driving source to a pair of wheels of the vehicle, and a control unit for actuating said auxiliary driving source and drivingly engaging said source with said wheels upon detection of a combination of predetermined conditions of a side brake switch, a generator output current, and an engine revolution per minute.

9. An auxiliary driving system in a vehicle according to claim 1, wherein said means for selectively drivingly connecting said auxiliary driving source to at least one wheel of said vehicle is operable to drive the vehicle using an amount of accelerator pedal depression and a vehicle speed, with a corresponding torque applied to said auxiliary driving source, when the side brake switch is OFF, the generator output current is zero, and the engine revolution per minute is equal to or smaller than a number of revolutions during idling of said vehicle engine.

10. An auxiliary driving system in a vehicle according to claim 9, wherein said means for selectively drivingly connecting said auxiliary driving source to at least one wheel of said vehicle is disabled to discontinue a creep force provided by said auxiliary driving source when the side brake switch is OFF, the generator output current is zero, and the engine revolution per minute is greater than the number of revolutions during idling of the engine.

11. An auxiliary driving system in a vehicle according to claim 1, wherein a motor creep control is made operable by said means for selectively drivingly connecting said auxiliary driving source to at least one wheel of said vehicle when the side brake switch is OFF and the generator output current is not zero, the motor creep control having three modes including:

a first mode of driving the vehicle with a creep force provided by said vehicle engine and the automatic transmission;

a second mode of driving the vehicle with the creep force provided by said auxiliary driving source; and a third mode of driving the vehicle with the creep force provided by said vehicle engine, the automatic transmission, and the auxiliary driving source.

12. An auxiliary driving system in a vehicle according to claim 1, wherein said means for selectively drivingly connecting said auxiliary driving source to at least one wheel of said vehicle is disabled to discontinue a creep force provided by said auxiliary driving source when the side brake switch is ON.

13. An auxiliary driving system in a vehicle according to claim 8, wherein said control unit actuates said auxiliary driving source and drivingly engages said source with said wheels to drive the vehicle using an amount of accelerator pedal depression and a vehicle speed, with a corresponding torque applied to said auxiliary driving source, when the side brake switch is OFF, the generator output current is zero, and the engine revolution per minute is equal to or smaller than a number of revolutions during idling of the engine.

14. An auxiliary driving system in a vehicle according to claim 8, wherein said control unit disables said auxiliary driving source to discontinue a creep force provided by said auxiliary driving source when the side brake switch is OFF, the generator output current is zero, and the engine revolution per minute is greater than the number of revolutions during idling of the engine.

15. An auxiliary driving system in a vehicle according to claim 8, wherein a motor creep control is made operable by said control unit actuating said auxiliary driving source when the side brake switch is OFF and the generator output current is not zero, the motor creep control having three modes including:

a first mode of driving the vehicle with a creep force provided by the engine and the automatic transmission;

a second mode of driving the vehicle with the creep force provided by said auxiliary driving source; and a third mode of driving the vehicle with the creep force provided by the engine, the automatic transmission, and the auxiliary driving source.

16. An auxiliary driving system in a vehicle according to claim 8, wherein said control unit disables said auxiliary driving source to discontinue a creep force provided by said auxiliary driving source when the side brake switch is ON.

* * * * *